INVENTORS
CARL M. MENGANI
MATTHEW J. RELIS
BY Alfred V. Musumeci
AGENT

SCAN CONTROL APPARATUS FOR CHARACTER RECOGNITION DEVICES

Filed Aug. 28, 1961 4 Sheets-Sheet 2

INVENTORS
CARL M. MENGANI
MATTHEW J. RELIS
BY Alfred V. Musumeci
AGENT

SCAN CONTROL APPARATUS FOR CHARACTER RECOGNITION DEVICES

Filed Aug. 28, 1961 4 Sheets-Sheet 3

INVENTORS
CARL M. MENGANI
MATTHEW J. RELIS
BY Alfred V. Musumeci
AGENT

SCAN CONTROL APPARATUS FOR CHARACTER RECOGNITION DEVICES

Filed Aug. 28, 1961 4 Sheets-Sheet 4

INVENTORS
CARL M. MENGANI
MATTHEW J. RELIS
BY Alfred V. Musumeci
AGENT

United States Patent Office 3,240,872

Patented Mar. 15, 1966

3,240,872
SCAN CONTROL APPARATUS FOR CHARACTER RECOGNITION DEVICES

Matthew J. Relis, Fairlawn, N.J., and Carl M. Mengani, Brooklyn, N.Y., assignors to Burroughs Corporation, Detroit, Mich., a corporation of Michigan Filed Aug. 28, 1961, Ser. No. 135,105
7 Claims. (Cl. 178—7.2)

The present invention relates generally to an improved control for devices to read record media containing recorded information, and more specifically to apparatus for effecting scan control for said reading devices.

Briefly, the present invention may be described as comprising means for producing a beam of radiant energy, e.g. a light beam, to scan record media containing recorded information, such as characters. Deflection means displace the beam to scan the record media in a series of successive scans. Sensing means, such as a multiplier phototube or other light-sensitive devices, operate to sense the intensity of the beam after it has impinged the record media to generate a signal to indicate when the beam is impinging a character. The signal thus generated may be then transmitted to a recognition section which compares the pattern of such signals for a given character with stored patterns to effect identification of the character scanned. The signal thus generated may also be used, as in the device of the present invention, to actuate apparatus to control or vary the scanning rate of the radiant energy beam.

In the device of the present invention, the signal generated by the sensing means is utilized to actuate circuitry to effect a slower scanning rate each time during a scan of a character that the beam first encounters the character. This slower scanning rate is maintained until the beam has traversed completely across the character. The device then switches back to a faster scanning rate for the duration of that scan and does not resume the slower rate until, during a subsequent scan, the beam once again encounters the character. After the last scan of any character the device switches to the faster scanning rate and maintains this rate until the next character is encountered.

In an alternative embodiment of the present invention, the switching from a fast scanning rate to a slow scanning rate is delayed for a period subsequent to the first encounter of the character by the beam during a first scan of the character. After the delay period, the device of the alternative embodiment operates to switch to the slower scanning rate each time, during each scan subsequent to the delay period, that the character is first encountered.

The present invention also comprises limiting means to maintain the displacement of the radiant energy beam below an upper limit and above a lower limit. The scanning geometry of the present invention is arranged so that the characters to be recognized are maintained between the displacement limits of the radiant energy beam.

In character recognition devices, if a cathode ray flying spot scanner tube is used to generate the scan, it is possible to effect a slower scanning rate when the scanning beam enters the area of the character since the scanning rate of a cathode ray tube may be readily altered by changing the slope of the deflection wave form.

In the cathode ray flying spot scanner tube, an electron beam is generated which impinges upon the face of the tube thereby causing a light beam to be generated at that point. The light beam thus produced is focused through a lens onto opaque record-bearing media containing the character to be scanned. The light beam is then reflected from the record-bearing media to a multiplier phototube. Assuming that the record-bearing media and the characters printed thereon are of contrasting shades, the multiplier phototube will generate a video signal which will be representative of the area upon which the light beam impinges thereby enabling the determination of whether the light beam has impinged a character or part of the background area. The video signal may then be transmitted to the recognition section which may contain stored information with which the video signal may be compared in order to effect identification of the character scanned.

It should be pointed out that the reference herein to a cathode ray flying spot scanner tube is exemplary and not intended to limit the scope of the present invention. Other devices effective to produce the desired result may be substituted by those skilled in the art without departing from the scope of the present invention.

In some character recognition systems, the recognition process involves the element-by-element comparison of the elements of the scanned character with stored elements for each character. Sequential access to the storage elements for each character may be required in such systems. Since the number of storage elements may be fixed, increase in scanning rate increases rate of access to storage elements. In character recognition systems great emphasis is placed on high character reading rate. This gives rise to the requirement of a high scanning rate and high rates of access to storage elements. High rates of access to storage elements are often disadvantageous because of attendant circuit design problems.

In character recognition equipment of the type required to read isolated characters, i.e., material with clear spaces between adjacent characters, the recognition process may be initiated when the scanning spot first enters a character. In order to locate the initiation of the scanning process with respect to the character with sufficient accuracy, it is necessary that the horizontal scanning pitch be sufficiently fine with respect to the character width. A ratio of character width to horizontal scanning pitch of 30:1 is common. To adequately resolve the lines of a character in scanning it vertically for character recognition, about 20 elements per vertical scan must be resolved. Consequently, each vertical scan should subtend a character height and contain about 20 data elements.

The foregoing would indicate that the recognition equipment must generate 30 vertical scans for every character to be recognized, and that each vertical scan must contain about 20 elements to adequately resolve the lines of a character. This would result in 600 recognition elements per character. This is a far larger number of elements than that required to adequately define the character.

The reason for a ratio of character width to horizontal scan pitch of 30:1 is to insure accurate location of the initiation of a scanning process with respect to the character. This would indicate that a finer scanning pitch is necessary at the time when the scanning beam first encounters a portion of a character and that the number of vertical scans per character width could be decreased once initiation of the recognition process has been accurately located. Decreasing the scanning pitch once the initiation of the recognition process is accurately located with respect to the character results in a decrease in the number of data elements generated per character. This then would permit a decrease in the rate of access to the storage elements thereby eliminating attendant circuit design problems.

The number of data elements required for accurate recognition of a character is in the order of 100 elements per character. Therefore, prior to initiation of the recognition process while the scanning beam is scanning the clear space between adjacent characters, the scanning rate may be such as to enable the generation of 600 elements per character. Once the recognition process has commenced, and its initiation has been accurately located, the scanning rate could be slowed down to generate 100 elements per character. This would insure accurate location of the initiation of the recognition process, and at the same time permit accurate recognition of the character to be scanned without a high rate of access to storage elements.

It is an object of the present invention to provide apparatus for improved control of devices to read record media containing recorded information.

It is a further object of the present invention to provide scan control apparatus for character recognition equipment which will minimize rate of access to storage elements by decreasing the number of recognition elements for recognition of a character.

It is a further object of the present invention to provide character recognition equipment having a slow scanning rate in the area where a character may exist, and a fast scanning rate elsewhere.

It is a further object of the present invention to provide scan control apparatus which will insure accurate location of the initiation of the recognition process in character recognition devices.

It is a further object of the present invention to provide character recognition equipment wherein the scanning rate of a cathode ray flying spot scanner tube is controlled in response to the video signal generated by a multiplier phototube.

It is a further object of the present invention to provide character recognition equipment having a scan height which is independent of scanning rate, and which is also independent of the location, within the scan height, of the character to be recognized.

It is a further object of the present invention to provide apparatus to accomplish the foregoing objects without decreasing the reading rate of character recognition devices.

In order to more accurately define the features of the present invention the device may be described as being in "scan" when the scanning beam is traveling from the lowest point in its sweep, located somewhere below a character and called the "lower sweep limit," to the highest point in its sweep, called the "upper sweep limit" and located somewhere above the character. When the scanning beam is traveling from the upper sweep limit to the lower sweep limit it will be considered in "retrace."

In accordance with the invention, when the scanning beam first approaches a character and while it is traveling in the clear space just to the left of a character, it will be in fast mode; that is, it will be generating a higher number of vertical scans for each increment of horizontal travel. When, during a scan portion of the sweep, the beam first encounters a portion of a character, it will be switched to slow mode; that is, it will be generating a lower number of vertical scans for each increment of horizontal travel. From the point where the scanning beam first encounters a portion of a character it will continue in slow mode until it has traversed a vertical distance equal to the maximum height of any character, then switch back to fast mode and continue in fast mode to the upper sweep limit. The beam will then retrace back to the lower sweep limit and commence the scan portion of the sweep in fast mode. It will continue in fast mode until a portion of the character is once again encountered. This cycle will be repeated until the character has been completely scanned. During the portion of the sweep when the scanning beam has completely scanned a character and is in the clear space between characters, it will be in fast mode and continue in fast mode until it encounters the first black portion of the next character.

At this point it should be pointed out that two forms of the present invention are to be described. In the foregoing, the first scan to encounter a character switched the system to slow mode immediately upon encountering the character. In an alternative form, at the time that the first scan to encounter a character first encounters a character, it actuates a delay circuit. The delay circuit allows the beam to continue in fast mode until several scans have elapsed. After the proper delay of a predetermined number of scans, at the point where the next scan first encounters the character, the beam is switched to slow mode. From this point it continues in a manner similar to the manner just described to switch to fast mode after the maximum height of any character has been traversed, and back to slow mode when the next scan encounters a portion of the character. Inhibiting the switching to slow mode in this manner provides for more accurate location of the initiation of the recognition process and also avoids the possibility that a character having a steep leading edge will not be adequately scanned for accurate recognition.

Characterization of the scan mode as fast or slow is determined by the velocity with which the scanning beam is deflected from one sweep limit to the other. For purposes of this description it will be assumed that the scanning beam is traveling in a vertical direction only and that the character to be scanned is traveling horizontally from right to left. Other recognition procedures may be used with the device of the present invention without departing from the scope thereof. Therefore the aforementioned method of effecting motion of the scanning beam relative to the character is regarded as being for purposes of description only and is not intended to limit the scope of the present invention.

The velocity of deflection of the scanning beam may be controlled by controlling the electrical condition of the deflection element in the beam generating apparatus. Since a cathode ray flying spot scanner tube has been referred to to describe the present invention, it will be assumed that the deflection element is a magnetic deflection coil or yoke positioned on the cathode ray flying spot scanner tube. The present invention envisions a magnetic deflection coil and associated equipment to control the rate of current flow therethrough by controlling the rate of discharge of a circuit capacitor. A fast capacitor discharge rate results in a high rate of change of current through the magnetic deflection coil thereby imparting a high deflection velocity to the scanning beam and resulting in operation of the device in fast mode. A slower rate of capacitor discharge results in a lower rate of change of current through the magnetic deflection coil thereby effecting the operation of the scanning beam in slow mode. The rate of capacitor discharge is determined by the impedance in the discharge path of the capacitor. When a high capacitor discharge rate is desired a low impedance is placed in the capacitor discharge path; when a low capacitor discharge rate is desired a higher impedance is switched into the path of the discharging capacitor.

As herein described, the present invention operates with the scanning beam in the portion of its sweep when the capacitor is discharging. The capacitor charges during the retrace portion of the sweep. Control of the sweep height is effected by circuitry which initiates charging of the capacitor when the upper sweep limit is reached and discharging of the capacitor when the lower sweep limit is reached.

The relationship between capacitor charge and discharge, and the direction of deflection of the scanning beam is as herein set forth for descriptive purposes only. It will be apparent to those skilled in the art that the mode of operation of the capacitor, the direction of current flow through the coil, the position of the coil relative the cathode ray tube, and the relative direction of deflection of the scanning beam may be varied without departing from the spirit and scope of the present invention.

For a better understanding of the present invention reference will be made to the following figures of drawing, and the detailed description thereof which follows, wherein similar reference numerals refer to similar elements throughout the various figures of the drawing.

Figures 2, 3A, 3B:
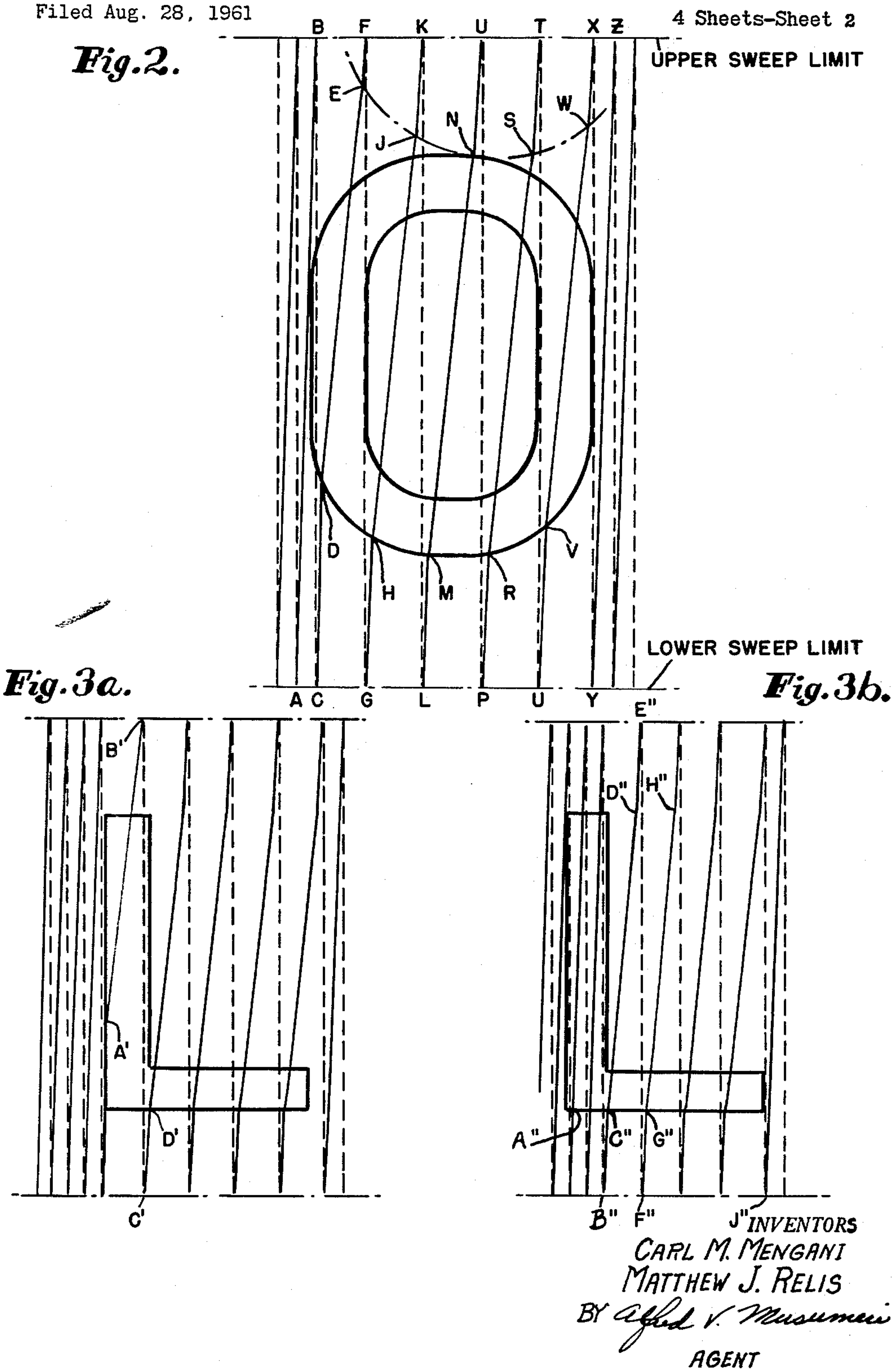
FIG. 2 illustrates a method of scanning a character for one form of the present invention, showing the path followed by the scanning beam.

FIG. 3*a* illustrates a method of scanning a character for one form of the present invention, showing the path followed by the scanning beam.

FIG. 3*b* illustrates a method of scanning a character for an alternative form of the present invention, wherein the switch to slow mode is delayed for a period of a few scans after the scanning beam first encounters a portion of the character.

Figure 4:
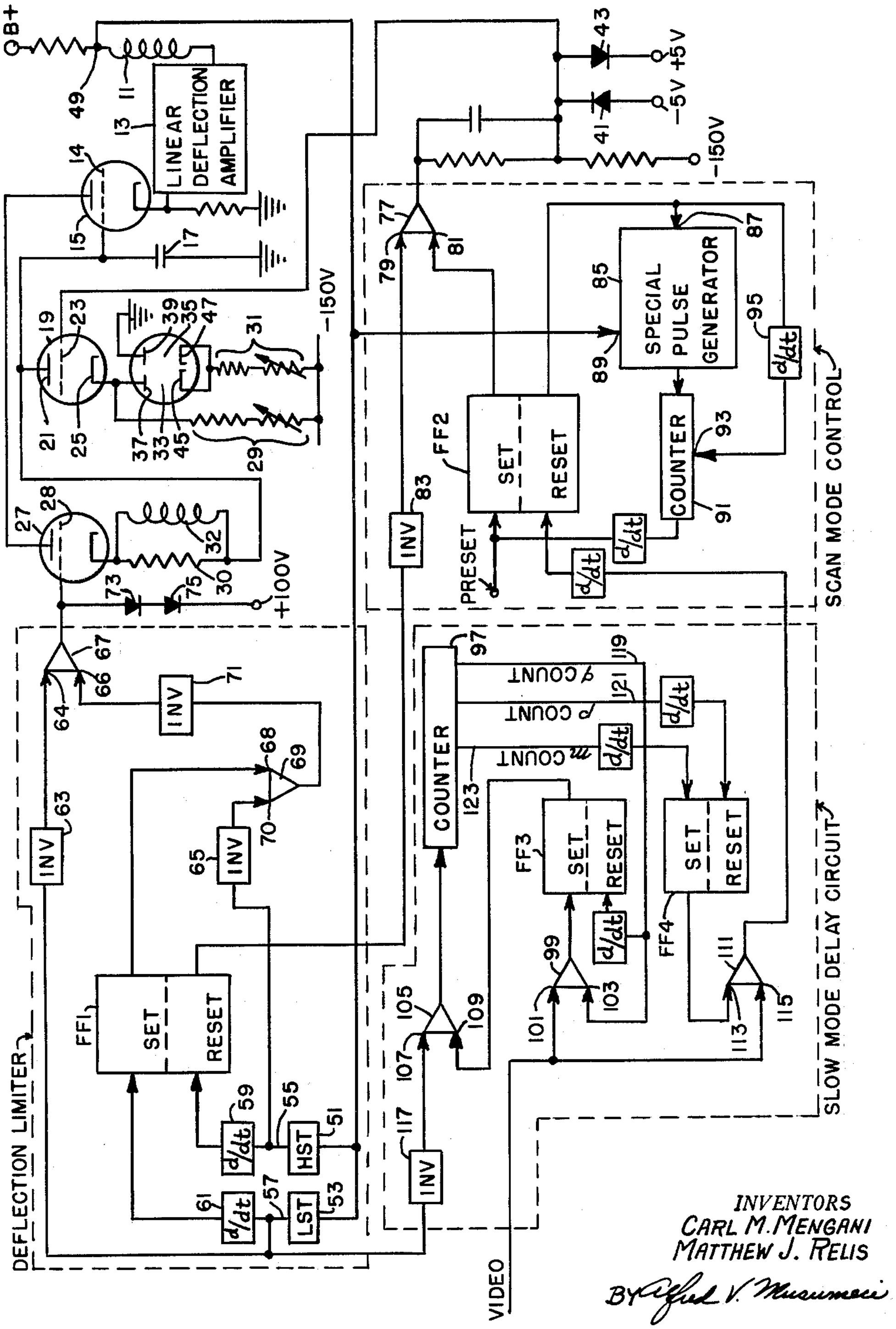

FIG. 4 is a schematic diagram showing the circuit of one form of the present invention partially in block form.

Figure 5:
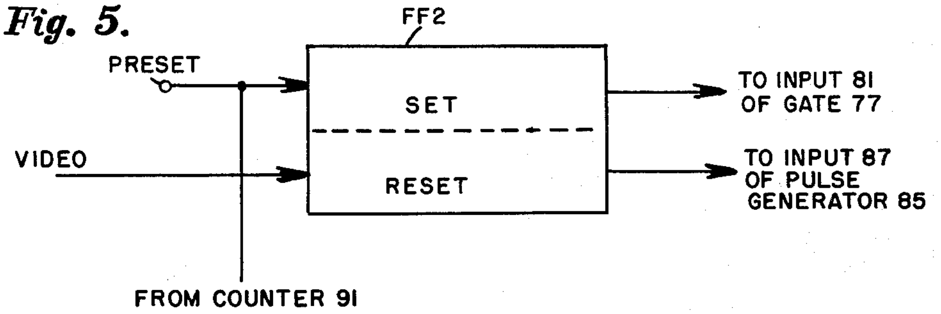

FIG. 5 shows schematically circuitry which when substituted for the Slow Mode Delay circuit of FIG. 4 operates to actuate slow mode scan without delay.

Figure 6:
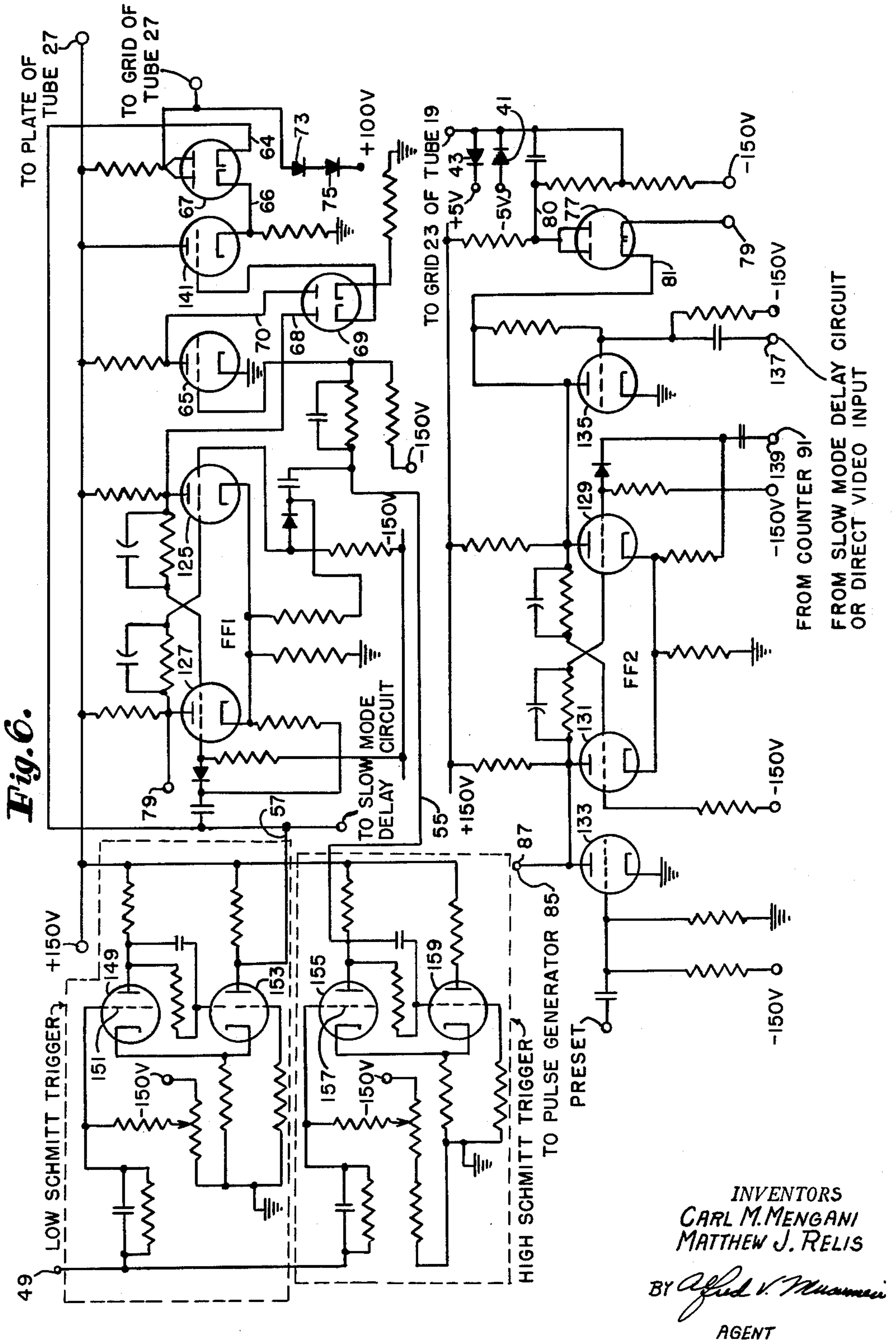

FIG. 6 shows actual circuitry for a portion of the circuitry shown in block form in FIG. 4.

Figure 1:
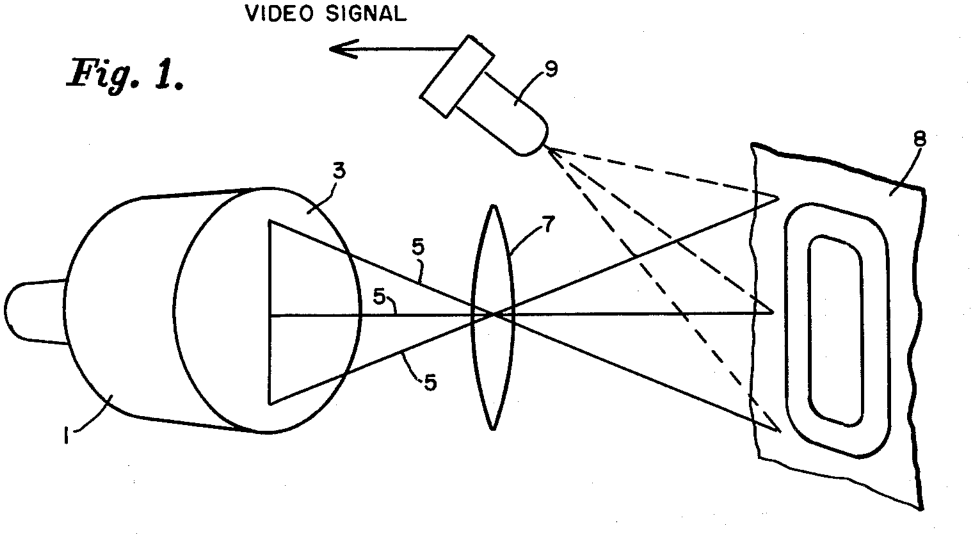
FIG. 1 shows one arrangement by which a cathode ray flying spot scanner tube may be used with the present invention.

FIG. 1 is a schematic representation of the cathode ray flying spot scanner. The arrangement depicted therein shows one manner in which such a tube map be used with the present invention. In the arrangement of FIG. 1, the cathode ray tube 1 generates internally an electron beam whose deflection may be controlled by coils such as the coil 11 of FIG. 4. When the electron beam impinges the face 3 of the tube 1 a light beam 5 is generated which is focused by means of lens 7 to impinge record media 8. The reflection of light beam 5 is sensed by a phototube 9 which then generates a video signal, to indicate whether the light beam is impinging a portion of a character.

Referring now to FIG. 2, as the scanning beam approaches the character from the left it is in fast mode. As the scanning beam traverses a path from point A at the lower sweep limit to point B at the upper sweep limit it is executing the scan portion of the sweep cycle in fast mode. When the beam reaches the upper sweep limit at point B it is blanked out and regenerated at point C. From point B to point C the system is in retrace.

The retrace portion of the sweep cycle is shown in dotted form to indicate that for purposes of this description the scanning beam is to be considered blanked out during retrace by circuitry not herein shown. Circuitry for blanking and unblanking a scanning beam is well known in the art and it is felt that a description thereof is not necessary in setting forth the present invention. Alternatively, the beam may be operated unblanked at all times and instead the retrace video output of the phototube may be inhibited in a gate following the phototube, by an inhibition pulse generated during retrace.

When the scanning beam reaches the lower sweep limit at point C a scan is once again generated and the beam travels in fast mode to point D. At point D the scanning beam first encounters a portion of the character to be recognized. In accordance with one form of the present invention, the beam now switches to slow mode and continues to scan the character in slow mode until point E is reached. The distance between point D and E is a predetermined distance equal to the maximum height of any character. At point E the beam once again switches to mast mode, and continues to scan in fast mode to point F at the upper sweep limit. The beam retraces to the lower sweep limit at point G and commences once again to scan in fast mode to point H where it again encounters a portion of the character and switches to slow mode. After having traversed a distance equal to the maximum height of any character in slow mode the beam once again switches to fast mode at point J.

When the point X at the upper sweep limit is reached the beam has completely scanned a character. The beam retraces to point Y at the lower sweep limit and commences once again to generate a scan. As the beam scans from point Y to point Z it does not encounter a portion of the character and therefore does not switch to slow mode scan. The beam will continue generating a fast mode sweep until the next character is reached. When the beam first encounters a portion of the next character to be recognized the cycle just described will be repeated.

The line E J N S W defines the locus of slow-to-fast mode transition points. The line D H M R V defines the locus of fast-to-slow mode transition points. The area bounded by these two lines and the lines D E and V W is the area within which the elements of the scanned character are compared with stored elements for each character. At certain predetermined points during each slow mode scan, recognition occurs to determine if the point overlies part of a character or part of the background area. The representation of these points is then compared with storage elements stored in the machine for character recognition. If provision is made for a sufficient number of storage elements to effect 20 recognition points per scan, a pitch of 5 vertical scans per character width, as shown in FIG. 2, would permit comparison at 100 points during the scan of a character. This is adequate to effect accurate recognition. Thus, by providing for a slower scan rate during the scanning of a character, the rate of access to storage elements may be lessened without lessening the accuracy or reading rate of the machine.

Referring now to FIG. 4, there is shown the deflection coil 11 which controls the deflection of the scanning beam in the cathode ray flying spot scanner tube. The deflection velocity of the scanning beam will be determined by the rate of change of current through the coil 11.

The rate of change of current through the coil 11 is controlled by the rate of discharging of the capacitor 17. If the capacitor 17 discharges at a fast rate current will flow through the coil 11 at a fast rate and consequently the scanning beam will be deflected at a faster velocity. A slow rate of capacitor discharge will result in a slow rate of current flow through the coil 11 and a slower deflection velocity of the scanning beam.

The charging and discharging of capacitor 17 controls the operation of the cathode follower 15. The voltage applied to the grid 14 of the tube 15 by the capacitor 17 is reproduced in the cathode circuit of the tube 15 and comprises the input to the linear deflection amplifier 13. The linear deflection amplifier 13 generates an output current which is a linear function of the input voltage. The linearity between input voltage and output current is desirable to insure that the scanning beam is deflected with a constant deflection velocity when capacitor 17 discharges at a constant rate. The linear deflection amplifier can be any one of a number of well-known devices capable of performing the designated operation.

A constant deflection velocity is a desideratum of many character recognition systems because of the nature of the recognition process to identify certain preselected points on the character to be recognized, as has been previously discussed. Displacement of the scanning beam as it scans the character should be carefully controlled so that a predetermination may be made of the time when a scanning beam reaches a recognition point within the scanning area, and so that recognition of that point as part of a character or part of the background may occur.

In magnetic deflection tubes, such as the cathode ray flying spot scanner tube referred to in describing this invention, the deflection of the scanning beam is a linear function of the deflection coil current to within a small percentage if a well-designed deflection coil is used. If the current fed to the deflection coil 11 by the linear deflection amplifier 13 is made a linear function of the input voltage, it will be apparent that the input voltage and the current appearing in the deflection coil 11 will be very accurate indications of the instantaneous location of the scanning spot. This will permit accurate identification of the location of the scanning spot thereby facilitating recognition and scan control.

The linear deflection amplifier input voltage generated at the cathode circuit of the cathode follower 15 is a linear function of the voltage on the capacitor 17. The operation of the capacitor 17 in charging and discharging is maintained as a linear function of time, as will be hereinafter described, so that the deflection velocity function of the scanning spot may be maintained constant.

Capacitor 17 is connected to the plate 21 of tube 19. Capacitor discharge takes place through the tube 19. A connection is also shown from the capacitor 17 and plate 21 of tube 19, to the cathode circuit of tube 27. The tube 27, when it is conducting, operates to charge the capacitor 17. When tube 27 is nonconductive capacitor 17 discharges through tube 19.

Thus, the operation of capacitor 17 is controlled by the operation of tube 27, which in turn is controlled by the voltage applied to grid 28. When the voltage on grid 28 is such that tube 27 conducts, capacitor 17 is charging and the system is executing the retrace portion of the sweep cycle. When the voltage on grid 28 causes tube 27 to cut off, the capacitor 17 discharges through tube 19 and the system is executing the scan portion of the sweep cycle. The circuitry to control the mode of operation of tube 27 is shown enclosed within the line labeled Deflection Limiter, and will be hereinafter described.

The rate of discharge of capacitor 17 is controlled by the discharge tube 19 and its associated circuitry. The cathode circuit of tube 19 is composed of resistors 29 and 31. Resistors 29 is of a high value and determines the discharge rate of capacitor 17 for slow mode scan. Resistor 31 is of a low value and, when placed in parallel with resistor 29, determines the discharge rate for fast mode scan. When fact scan rate is desired, the capacitor 17 is discharged through the tube 19 and through the cathode circuit comprising resistors 29 and 31 in parallel. When a slow scan rate is desired, the resistor 31 is switched out of the discharge path of capacitor 17 and capacitor 17 discharges through the tube 19 and through resistor 29. The switching of resistor 31 in and out of the discharge path of capacitor 17 is controlled by diodes 33 and 35. The operation of diodes 33 and 35 is in turn controlled by the voltage level applied to the grid 23 of tube 19. The grid 23 of tube 19 is connected to diodes 41 and 43. Circuitry to be hereinafter described, shown enclosed within the line labeled Scan Mode Control, operates to cause either diode 41 or 43 to conduct. When diode 41 conducts the grid 23 is clamped to a −5 volt level. When diode 43 conducts the grid 23 is clamped to a +5 volt level. Clamping of the grid 23 to the −5 volt level through diode 41 causes the anode 37 of diode 33 to go negative with respect to the anode 39 of diode 35. Diode 33 will therefore be cut off and diode 35 will conduct. This causes the cathodes 45 and 47 to clamp to the potential of anode 39. Since diode 33 is nonconductive resistor 31 will be switched out of the discharge path of capacitor 17, capacitor 17 will discharge at its slower rate, and the scanning beam will be in slow scan. When grid 23 is clamped to the +5 voltage level through diode 43, the anode 37 of diode 33 will be positive with respect to anode 39 of diode 35, diode 33 will conduct, and diode 35 will cut off. This will cause resistor 31 to be switched into the discharge path of capacitor 17, capacitor 17 will discharge through resistors 29 and 31 in parallel and the scanning beam will be in fast scan.

The tube 27 is held nonconductive while capacitor 17 is discharging and the scanning beam is in the scan portion of its cycle. When the scanning beam reaches the upper sweep limit the tube 27 is rendered conductive causing capacitor 17 to commence charging. Capacitor 17 begins to charge when the retrace portion of the sweep cycle is initiated. The circuitry labeled Deflection Limiter, for controlling the operation of tube 27, will now be described.

A connection is made between the point 49 in the circuit of coil 11, and the two Schmitt triggers 51 and 53. As has been stated, the current in the coil 11 is an accurate indication of the instantaneous location of the scanning spot. This is also true of the voltage at point 49, which is one end of a resistor which carries the coil current. The high Schmitt trigger 51 is set to generate an output pulse on its output lead 55 in response to the voltage at point 49 when the scanning spot reaches the upper sweep limit. The low Schmitt trigger 53 is set to generate an output pulse on its output line 57 when the scanning beam is at the lower sweep limit. The Schmitt triggers are connected through differentiators 61 and 59 to control the state of flip-flop FF1. When the scanning beam reaches the upper sweep limit the high Schmitt trigger 51 generates a voltage excursion on its output line 55. This excursion is transmitted through differentiator 59 to place flip-flop FF1 in the reset condition. When the scanning beam is at the lower sweep limit the low Schmitt trigger 53 generates a voltage excursion on its output line 57. This excursion is transmitted through differentiator 61 to place flip-flop FF1 in the set condition.

The ouput 57 of the low Schmitt trigger 53 is connected to an "AND" gate 67 through an inverter 63. The output 55 of the high Schmitt trigger 51 is connected to an "AND" gate 69 through an inverted 65. When the scanning beam reaches the lower sweep limit the low Schmitt trigger 53 generates an enabling pulse on its output line 57 which is inverted by inverter 63 and operates to disable gate 67. At all other times when the scanning beam is above the lower sweep limit, gate 67 is enabled through inverter 63 due to the fact that low Schmitt trigger 53 is generating a disabling pulse.

When the scanning beam reaches the upper sweep limit the high Schmitt trigger 51 generates an enabling pulse on its output line 55 which is inverted in inverter 65 and operates to disable gate 69. When the scanning beam is below the upper sweep limit the high Schmitt trigger 51 will be generating a disabling pulse on its output line 55 which will be inverted in inverter 65 and operate to enable gate 69.

The output of gate 69 is connected to an input 66 of gate 67 through inverter 71. When gate 69 is enabled it will generate an enabling pulse which will be inverted in inverter 71 and apply a disabling pulse to the input 66 of gate 67. If gate 69 remains disabled an enabling pulse will continue to be applied at input 66 of gate 67 due to inverter 71.

Gate 67 determines whether tube 27 is to be conductive or nonconductive. Depending upon the type of gate used, and by connecting the proper clamping circuit to the grid 28 of tube 27, the output of gate 67 will operate to turn tube 27 on and off. For purposes of description, grid 28 is shown connected to a +100 volt clamp through diodes 73 and 75, and when gate 67 is enabled a positive pulse is developed on its output which causes grid 28 to clamp to the +100 volt source thereby causing tube 27 to be rendered conductive. When gate 67 is disabled a negative-going pulse appears on its output line causing grid 28 to go out of clamp and to become sufficiently negative for tube 27 to be rendered nonconductive. As is well known to those skilled in the art, the polarities of voltages or voltage excursions referred to in this description may be interchanged provided that proper adjustment is made of the poling of electron devices, the polarity of the electron devices (e.g., NPN or PNP transistors), and provided further that proper voltage inversions are introduced, without departing from the scope of the present invention.

The circuitry labeled Deflection Limiter operates to effect charging of capacitor 17 during retrace and discharging during scan. This is accomplished by rendering tube 27 conductive when the upper sweep limit is reached and the scanning beam begins the retrace portion of the sweep cycle, and by rendering tube 27 nonconductive when the scanning beam reaches the lower sweep limit and begins the scan portion of the sweep cycle.

In order to describe the operation of the Deflection Limiter it may initially be assumed that the scanning beam is in scan and that capacitor 17 is discharging through tube 19. At this time tube 27 will be nonconductive, gate 67 will be disabled, FF1 will be in the set condition, and gate 69 will be enabled.

The Schmitt triggers are set to sense the voltage at point 49 which will be an accurate indication of when the beam is at the upper or lower sweep limit. When the scanning beam reaches the upper sweep limit an output voltage excursion will be generated by the high Schmitt trigger 51 on line 55 which will operate, through differentiator 59, to place FF1 in the reset condition. When FF1 is in the reset condition, a disabling pulse is applied to input 68 of gate 69. When gate 69 is disabled its output is inverted in inverter 71 and operates to apply an enabling pulse at input 66 of gate 67. As has been previously stated, the low Schmitt trigger 53 operates, though inverter 63, to enable gate 67 except when the scanning beam is at or below the lower sweep limit. Therefore, when an enabling pulse appears at input 66 of gate 67 and the scanning beam is at the upper sweep limit, an enabling pulse will also appear at input 64 of gate 67. Gate 67 will be enabled, grid 28 of tube 27 will clamp to the +100 volt source, and tube 27 will be rendered conductive thereby causing capacitor 17 to commence charging, which in turn causes the system to commence the retrace portion of the sweep cycle.

When the cycle completes retrace and the scanning beam reaches the lower sweep limit, the low Schmitt trigger 53 generates a voltage excursion on output 57. This operates, through differentiator 61, to place FF1 in the set condition. The output on line 57 also operates, for the very short period of time during which the scanning beam is at the lower sweep limit, to disable gate 67 through inverter 63 to input 64. Although the disabling pulse at input 64 lasts for a very short period of time, the gate 67 is maintained disabled by a sustained disabling pulse at input 66. The circuitry for producing the sustained disabling pulse at input 66 will now be described.

Initially, it should be recalled that the high Schmitt trigger will generate a pulse at output line 55 when the scanning beam is at or above the upper sweep limit which will operate, through inverter 65, to apply a disabling pulse at input 70 of gate 69. When the scanning beam is below the upper sweep limit, the high Schmitt trigger generates at its output 55 a pulse which will operate, through inverter 65, to enable gate 69. With the scanning beam at the lower sweep limit and FF1 in the set condition, enabling pulses will be applied to both inputs 68 and 70 thus enabling gate 69 thereby producing an output which, inverted in inverter 71, operates to apply to input 66 a pulse which disables gate 67. It will therefore be apparent that a disabling pulse will be applied to input 66 of gate 67 whenever gate 69 is enabled, and that gate 69 will be enabled during the scan portion of the cycle due to the fact that during scan FF1 will be in the set condition, and due also to the fact that the high Schmitt trigger 51 will cause an enabling pulse to continue to be applied to input 70 of gate 69 whenever the scanning beam is below the upper sweep limit.

From the foregoing it will be seen that when the scanning beam reaches the upper sweep limit the gate 67 will be enabled thereby producing an output pulse which will cause tube 27 to be rendered conductive. When tube 27 begins to conduct capacitor 17 begins to charge. The initiation of the charging of capacitor 17 initiates the retrace portion of the sweep cycle. The system remains in retrace and capacitor 17 continues to charge until the scanning beam is regenerated at the lower sweep limit. When the scanning beam reaches the lower sweep limit the gate 67 is disabled thereby causing tube 27 to be rendered nonconductive. Capacitor 17 commences to discharge through the tube 19, and the scanning beam becomes deflected in scan toward the upper sweep limit.

The circuitry described in the foregoing serves the purpose of maintaining the scanning beam between the upper and lower sweep limits. This circuitry serves an additional purpose which will now be described.

If the system, after being stopped for any reason, would automatically commence operating to maintain the scanning beam between the upper and lower sweep limits it would be sufficient to connect the grid 28 of tube 27 directly to the set side of FF1. If however at the time the system is first turned on, the scanning beam is at either of the sweep limits it is possible for FF1 to be in the wrong condition and to remain in this condition thereby allowing the scanning beam to go beyond the sweep limit in the case of the upper sweep limit, or to remain at the sweep limit in the case of the lower sweep limit. The manner in which this situation might occur will be clear if it is borne in mind that the differentiators 59 and 61 operate to switch the flip-flop by sensing a voltage excursion, and that a sustained voltage level will not cause the differentiators to change the condition of the flip-flop.

In order to clarify this, let us assume that the scanning beam is traveling in an upward direction and is approaching the upper sweep limit. As has been previously stated, when a scanning beam reaches the upper sweep limit the high Schmitt trigger 51 generates a voltage excursion on output 55. This means that the voltage on output 55 goes from a first value to a second value. It is this change in voltage that is sensed by differentiator 59 and which causes the differentiator 59 to operate to place FF1 in the reset condition. After FF1 has been reset and the retrace portion of the sweep cycle is initiated, the high Schmitt trigger output 55 returns to the first value of voltage. Line 55 cannot go from the first voltage value to the second voltage value and back to the first instantaneously. There will be a very short period of time during which the high Schmitt trigger generates, on output 55, the second value of voltage.

Let us now assume that the system has just been turned on, and that the high Schmitt trigger has already generated the voltage excursion on output line 55, and that output line 55 is at the second value of voltage. Let us further assume that at this point in time FF1 is in the set condition. Since differentiator 59 only senses the voltage excursion which takes place when the voltage on output line 55 goes from the first value to the second value, and since the voltage on output line 55 is already at the second value, differentiator 59 will not operate to reset FF1. If FF1 were connected directly to grid 28 of tube 27, and the system were started with FF1 remaining in the wrong condition, tube 27 would remain nonconductive and capacitor 17 would continue discharging thereby resulting in a deflection of the scanning beam to a point beyond the upper sweep limit. In the situation where the system is started with a scanning beam at the lower sweep limit with FF1 in the wrong condition, capacitor 17 would remain fully charged and the scanning beam would remain at the lower sweep limit.

The inclusion of gates 67 and 69 and their associated circuitry, provides steering voltages gated with the voltage derived from FF1 to insure that when the system is at or beyond a sweep limit the voltage at the grid 28 of tube 27 is varied in a direction that will carry the scanning beam within the sweep limits. In order to describe this mode of operation let us assume that the capacitor 17 has discharged to its lower limit and that the scanning beam is at the upper sweep limit at a time when the system is first turned on. Let us further assume that the voltage on output line 55 of the high Schmitt trigger 51 is such that FF1 is not placed in the reset condition, but remains in the set condition. Under this set of circumstances tube 27 will be nonconductive since capacitor 17 has been discharging to deflect the scanning beam toward the upper sweep limit. It is now desired, once the upper sweep limit has been reached, to render tube 27 conductive and to cause capacitor 17 to commence charging. In order to render tube 27 conductive it is necessary to enable "AND" gate 67. Since the low Schmitt trigger 53 operates to disable "AND" gate 67 through inverter 63 and input 64 only when the scanning beam is at the lower sweep limit, input 64 will be experiencing an enabling pulse. If FF1 had switched to the reset condition, as would be the case in the normal mode of operation, input 68 would apply a disabling pulse to gate 69, gate 69 would be disabled, an enabling pulse would be applied to input 66 through inverter 71, and gate 67 would be enabled thereby causing tube 27 to be rendered conductive. It therefore becomes necessary to disable gate 69 through input 70. It will be apparent that gate 69 is disabled through the high Schmitt trigger output 55 if it is recalled that when the scanning beam reaches the upper sweep limit the high Schmitt trigger 51, during the time that the voltage on output 55 is at the aforementioned second value, generates a pulse through inverter 65 to disable gate 69. Disabling gate 69 will cause an enabling input to applied at input 66 of gate 67, gate 67 will be enabled and tube 27 will commence conducting thereby causing capacitor 17 to charge and the sweep cycle to go into retrace. Once the scanning beam has been restored to within the sweep limits the system will commence its normal cycle of operation.

When the system is turned on with the scanning beam at the lower sweep limit and FF1 remains in the wrong condition, the device will operate, in a manner similar to the one just described, to deflect the scanning beam to within the sweep limits and establish the normal cycle of operation. When the system is turned on with the scanning beam at the lower sweep limit and FF1 remaining in the reset condition, the low Schmitt trigger will generate, on line 57, an enabling pulse which will operate, through inverter 63, to disable gate 67. This will cut off tube 27 and capacitor 17 will commence discharging to initiate the scan portion of the sweep cycle. From the foregoing it will be apparent that the scanning beam is maintained within the sweep limits regardless of the condition of the equipment when the system is first turned on.

As has been previously stated, the scan mode is controlled by the voltage applied to grid 23 of tube 19. When grid 23 is clamped to +5 volts through diode 43 the scanning beam is in fast mode. When grid 23 is clamped to −5 volts through diode 41 the scanning beam is in slow mode. The determination of which clamping potential is to be applied to grid 23 is effected by the circuit labeled Scan Mode Control. The operation of this circuit will now be described.

The determination of which voltage will be applied to grid 23 is controlled by "AND" gate 77. Depending upon the type of gate used, a choice which must be consistent with the circuit logic of other parts of the system, enabling or disabling gate 77 will cause the grid 23 to clamp to either the −5 volt source or the +5 volt source. Consistent with the circuit logic thus far described it will be assumed that when gate 77 is disabled the grid 23 is clamped to the −5 volt source and the scanning beam switches to slow mode. Enabling gate 77 clamps grid 23 to the +5 volt source and causes the scanning beam to switch to fast mode.

Referring back to the Deflection Limiter, it will be recalled that FF1 is in the set condition during scan and in the reset condition during retrace. When FF1 is in the reset condition a disabling pulse is applied to input 79 of gate 77 through inverter 83. When FF1 is in the set condition, an enabling pulse is applied to input 79. When, during scan, the scanning beam encounters a black portion of the letter or character to be recognized a video signal is generated which operates through proper circuitry to place FF2 in the reset condition. The circuitry through which the video signal operates to reset FF2 distinguishes the alternative forms of the invention previously mentioned.

The video signal can operate directly on the reset side of FF2, or through the Slow Mode Delay Circuit of FIG. 4. FIG. 4, with the Slow Mode Delay Circuit shown therein, illustrates the form of the invention in which the switching to slow mode is inhibited for a period of several scans after a portion of character is first encountered. Removing the Slow Mode Delay Circuit and applying the video signal directly to FF2, as shown in FIG. 5, illustrates the form of the invention in which the switching to slow mode occurs without delay when the scanning beam first encounters a portion of a character. For the present the description of the form wherein the video signal is applied directly to FF2, as in FIG. 5, will be described. The form of the invention as shown in FIG. 4 including the Slow Mode Delay Circuit will be described subsequently.

With FF2 in the reset condition, a disabling pulse will be applied to input 81 of gate 77, gate 77 will be disabled and the scanning beam will switch to slow mode. The special pulse generator 85 and the counter 91 operate to place FF2 in the set condition in a manner to be herein subsequently described. With FF2 in the set condition an enabling pulse will be applied to input 81 of gate 77, and if an enabling pulse also appears on input 79, gate 77 will be enabled and the device will switch to fast mode.

In order to more clearly describe the operation of the pulse generator 85 and counter 91, the following explanation will be made with reference to FIG. 2. FIG. 2 shows the scan beam switching to slow mode at point D, continuing in slow mode to point E and then switching back to fast mode. The distance traveled by the scan beam between point D and point E is a distance equal to the maximum height of any character. As shown in FIG. 2, the scanning beam also travels a distance equal to the maximum height of any character between the following points: between H and J; between M and N; between R and S; between V and W. Assuming that FF2 of FIG. 4 switches to the reset condition whenever points D, H, M, R, and V are reached, the special pulse generator 85 and counter 91 will operate to allow the scanning beam to traverse a distance equal to the maximum height of any character and switch FF2 to the set condition when the scanning beam reaches points E, J, N, S, and W.

The pulse generator 85 is of the type which will generate an output pulse for each incremental change of input voltage. Pulse generator 85 has an input 89 which is derived from the point 49 in the circuit of coil 11. The input 89 will reflect the change in voltage through the coil as the scanning beam is deflected from one sweep limit to another thereby providing an accurate representation of the displacement of the beam. The distance traveled by the scanning beam in traversing a height equal to the maximum height of any character may be represented by a particular amount of voltage change ($V_2$–$V_1$) in the coil 11, ($V_2$–$V_1$) being made up of a number of incremental changes $\Delta V$. A gating pulse is derived from the reset side of FF2 and is applied to pulse generator 85 at input 87. When FF2 switches to the reset condition the input 87 causes pulse generator 85 to commence generating pulses which are applied to counter 91. For each incremental voltage change $\Delta V$, pulse generator 85 applies a pulse to counter 91. When the voltage at point 89 has undergone a change $n\Delta V$, equal to the voltage change ($V_2$–$V_1$) necessary for the scanning beam to have traversed a distance equal to the maximum height of any character, the counter 91 will have received $n$ number of pulses and will then generate an output which will place FF2 in the set condition. When FF2 switches to the set condition, gate 77 will be enabled and the sweep will be in fast mode. This occurs when the scanning beam reaches points E, J, N, S, and W, as shown in FIG. 2.

Counter 91 is shown with an input 93 derived from the charging (retrace) wave-form on capacitor 17 is independent of the scan mode control which is a requirement if the location of the scanning geometry relative to the character is to be independent of the vertical registration of the character in the scan.

It will be noted that portions of the circuit of FIG. 4 are shown in block form. FIG. 6 shows a circuit arrangement which may be substituted for the portions of FIG. 4 shown in block form. The circuitry of FIG. 6 will now be described.

Referring to FIG. 6, the tube 133 and the preset line connected thereto are provided to insure that the system is put in fast mode (via a specially-generated positive-going pulse on the grid of tube 133) by causing tube 133 to conduct, thereby setting FF2 at the beginning of the scanning of a record. In order to describe the operation of the circuitry of FIG. 6 let it be initially assumed that the system has just commenced to generate the scan portion of the sweep cycle and that the scanning beam is in fast mode. At this time FF1 is in the set condition with tube 125 on and tube 127 off. FF2 is in the set condition with tube 131 on and tube 129 off. Tube 127 supplies an input to "AND" gate 77 at point 79. Tube 129 supplies an input to "AND" gate 77 on line 81. With both flip-flops FF1 and FF2 in the set condition inputs 81 and 79 will be receiving positive pulses. "AND" gate 77 will be enabled and will be generating a positive pulse on its output 80. With "AND" gate 77 generating a positive pulse diode 43 will be conducting and the grid 23 of tube 19, shown in FIG. 4, will clamp to the +5 volts.

Let it now be assumed that the scanning beam has continued upwardly in scan and has first encountered a portion of a character to be recognized. After the desired delay interval, video from the Slow Mode Delay Circuit, or a direct video signal, depending upon which of the alternative forms is intended, will generate an input at point 137 to render tube 135 conductive. Tube 135 is normally biased off and when it commences conducting the plates of tubes 129 and 135 go more negative thereby cutting off tube 131. This in turn causes tube 129 to commence conducting. FF2 is now in the reset condition with tube 131 off and tube 129 on. With tube 129 conducting a negative excursion is applied to input 81 of "AND" gate 77. "AND" gate 77 is disabled and generates a more negative voltage at its output 80. This cuts off diode 43 and causes diode 41 to commence conducting. Grid 23 of tube 19 now clamps to the −5 volt source and the system is switched to slow mode.

When the beam has scanned a height equal to the maximum height of any character counter 91, shown in FIG. 4, generates a a negative-excursion pulse at point 139 to turn tube 129 off. FF2 will be placed in the set condition with tube 129 off and tube 131 on. This will operate to place the system in fast mode.

When the scanning beam reaches the upper sweep limit the high Schmitt trigger will generate an output on line 55. This output will be a negative voltage excursion and drive tube 125 into a nonconductive state. FF1 will be reset with tube 125 off and tube 127 on. With tube 125 nonconductive a positive potential will be applied to input 68 of gate 69. Gate 69 will commence conducting and generate a positive voltage excursion to the grid of tube 141 thereby driving tube 141 on. When tube 141 conducts a positive potential is applied to input 66 of gate 67. Input 64 of gate 67 is connected to the low Schmitt trigger output 67 which generates a positive potential whenever the beam is above the lower sweep limit. With a positive potential on input 64 and input 66, gate 67 is nonconductive and a positive potential is applied to the grid 28 of tube 27 thereby causing grid 28 to clamp to the +100 volts source through diodes 73 and 75. Tube 27 is driven conductive and commences to charge capacitor 17 thereby placing the system in retrace. At the end of retrace the low Schmitt trigger generates a negative output on line 57 thereby driving input 64 of gate 67 negative. Gate 67 conducts and applies a negative voltage excursion to grid 28 of tube 27. Grid 28 goes out of clamp and tube 27 ceases conducting. Capacitor 17 then commences to discharge through tube 19 and the system is once again generating the scan portion of the sweep cycle.

As was previously stated, if the system, after being turned off for any reason, would commence generating the sweep waveform it would be sufficient to connect the plate of tube 125 to the grid 28 of tube 27. If the system is first turned on with the scanning beam at one of the sweep limits and with FF1 in the wrong condition the scanning beam will go beyond the sweep limit in the case of the upper sweep limit or remain at the sweep limit in the case of the lower sweep limit. To prevent this situation steering voltages, gated with the voltage derived from FF1, are provided to insure that when the system is at or beyond a sweep limit the voltage at grid 28 of tube 27 is such as to cause the voltage on capacitor 17 to vary in a direction that will carry the scanning beam to within the sweep limits.

To explain this phase of operation let it be assumed that when the system is initially turned on the scanning beam is at the upper sweep limit with the system at the completion of the scan portion of the sweep cycle, and that the high Schmitt trigger is already generating a negative voltage on output line 55. Under these conditions tube 125 will remain on and, if the plate of tube 125 were connected to grid 28, tube 27 would remain nonconductive and capacitor 17 would continue discharging thereby driving the scanning beam to beyond the upper sweep limit.

In the circuit of FIG. 6, the negative voltage generated by the high Schmitt trigger on output 55, besides being applied through a differentiator to the grid of tube 125, is applied to the grid of tube 65. With a negative potential on output 55 tube 65 is driven nonconductive thereby applying a positive voltage to input 70 of gate 69. Gate 69 commences conducting and applies a positive voltage to the grid of tube 141. Tube 141 conducts and applies a positive voltage to input 66 of gate 67. A positive voltage is also applied to input 64 of gate 67 from the low Schmitt trigger output 57. Gate 67 is rendered nonconductive and generates a positive output to grid 28 of tube 27. Grid 28 clamps to the +100 volt source and tube 27 begins to conduct. This causes capacitor 17 to commence charging thereby initiating the retrace portion of the sweep cycle and driving the scanning beam to within the sweep limits.

If the system is initially turned on with the scanning beam at the lower sweep limit and with the low Schmitt trigger already generating a negative potential on output 57, the low Schmitt trigger output will not operate to turn tube 127 off and tube 125 on. Under these conditions if the plate of tube 125 were connected to grid 28 of tube 27, a positive potential would be applied to grid 28 and tube 27 would remain conductive. This would prevent capacitor 17 from discharging, capacitor 17 would remain fully charged and the scanning beam would remain at the lower sweep limit.

With the circuitry of FIG. 6, when the low Schmitt trigger is generating a negative voltage on output 57, this negative voltage is applied to input 64 of gate 67. This causes gate 67 to commence conducting and to generate a negative output which is applied to grid 28 of tube 27. Grid 28 goes out of clamp and tube 27 is driven nonconductive. Capacitor 17 now commences discharging through tube 19 and the scan portion of the cycle is initiated.

The operation of the Schmitt triggers will now be explained. The Schmitt triggers are set to deliver an output which is representative of the position of the scanning beam. Referring to FIG. 6, the Schmitt triggers receive an input at point 49 which is the same as the point labeled 49 in FIG. 1. Tube 149 of the low Schmitt trigger is normally on and tube 153 is normally off. When the scanning beam reaches the lower sweep limit a low voltage value is developed at point 49 which is transmitted to the grid 151 to cause tube 149 to become nonconductive. When tube 149 cuts off tube 153 turns on. With tube 153 on, a negative voltage excursion is developed on output 57. When the scanning beam moves slightly above the lower sweep limit the voltage at point 49 rises sufficiently to cause tube 149 to once again conduct thereby cutting off tube 153. The voltage on output line 57 then returns to the original positive value.

As the beam reaches the upper sweep limit a positive voltage value is developed at point 49 which is transmitted to the grid 157 of tube 155. Tube 155 is normally off and tube 159 is normally on. The positive voltage value applied to grid 157 operates to turn on tube 155. When tube 155 goes on tube 159 goes off. At this point a negative excursion is developed on output line 55. When the scan beam drops below the upper sweep limit the voltage at point 49, and on grid 157, drops sufficiently to cause tube 155 to go off thereby driving tube 159 on. The voltage on output line 55 then returns to the original positive value.

Referring back to the description of other portions of the circuit of the present invention it will be seen that the Schmitt triggers, by sensing the voltage level on the coil 11, determine the position of the scanning beam and operate to trigger the proper circuitry to maintain the beam between the sweep limits.

While there have been shown and described the fundamental novel features of the present invention as applied to several preferred embodiments thereof, it will be understood that various omissions, substitutions and changes in the form, detail and operation of the devices illustrated may be made by those skilled in the art, without departing from the spirit and scope of the invention.

What is claimed is:

1. Scan control apparatus for devices to read record media containing recorded information comprising, means for producing a beam of radiant energy, deflection means for displacing said beam to scan said record media in a series of successive scans, sensing means for generating a signal when said beam impinges said recorded information, control means for effecting a first and a second scanning rate, and circuit means responsive to said signal to actuate said control means to effect said second scanning rate, said circuit means including means to delay the actuation of said control means for a plurality of scans subsequent to the first sensing of said recorded information, and thereafter to actuate said control means to effect said second scanning rate at the first encounter of said recorded information during each scan subsequent to said delay period, and said circuit means being operative to maintain said second scanning rate for a predetermined displacement of said recorded information with respect to said beam.

2. Scan control apparatus for devices to read record media containing characters comprising, means for producing a beam of radiant energy to impinge said record media, deflection means for displacing said beam to produce a series of successive scans, sensing means to generate a signal when said beam impinges a character, control means operative to switch the scanning rate of said deflection means from fast to slow and vice versa, circuit means responsive to said signal derived from said beam and operative to actuate said control means to switch from fast to slow scan when a character is sensed, and means transmitting to said control means a representation of the displacement of said beam, said control means operative in response to said representation to restore said beam to said fast scanning rate after said beam and said character have been displaced with respect to each other a predetermined distance at said slow scanning rate.

3. The combination of claim 2 wherein said circuit means comprise delay means triggered by said signal at the first encounter of a character by said beam during the first scan of a character to effect a delay period of a plurality of scans, and thereafter to actuate said control means to effect said slow scanning rate at the first encounter of said character by said beam during each scan subsequent to said delay period.

4. The combination of claim 2 wherein said control means comprise pulse generating means responsive to said representation of the displacement of said beam, said pulse generating means being actuated upon the initiation of said slow scanning rate to emit a pulse each time said beam is displaced an incremental distance at said slow scanning rate, a bistable flip-flop to effect said fast scanning rate when in one of its stable states and said slow scanning rate when in its other stable state, and counting means switching said flip-flop to effect said fast scanning rate when said pulse generating means has emitted a predetermined number of pulses.

5. The combination of claim 4 including a capacitor controlling operation of said deflection means, and connecting means between said capacitor and said flip-flop to cause said flip-flop to control said capacitor to effect said fast scanning rate when said flip-flop is in one of its stable states and to effect said slow scanning rate when said flip-flop is in its other stable state.

6. The combination of claim 5 wherein said connecting means comprise variable impedance discharge means for said capacitor, controlled by said flip-flop to assume a high impedance value to effect said slow scanning rate, and a low impedance value to effect said fast scanning rate.

7. The combination of claim 6 including limiting means responsive to the position of said radiant energy beam, and charging means responsive to said limiting means controlling said capacitor to effect reversal of the direction of displacement of said beam when said beam reaches an upper or lower displacement limit.

References Cited by the Examiner

UNITED STATES PATENTS

| | | | |
|---|---|---|---|
| 2,700,700 | 1/1955 | De France | 178—7.7 |
| 2,957,941 | 10/1960 | Covely | 178—6.8 |
| 3,111,647 | 11/1963 | Heizer | 178—7.2 |

FOREIGN PATENTS

| | | |
|---|---|---|
| 659,596 | 10/1951 | Great Britain. |

DAVID G. REDINBAUGH, *Primary Examiner.*